No. 803,221.
PATENTED OCT. 31, 1905.
W. C. FISHER.
WOVEN CARTRIDGE BELT.
APPLICATION FILED DEC. 31, 1904.
2 SHEETS—SHEET 2.
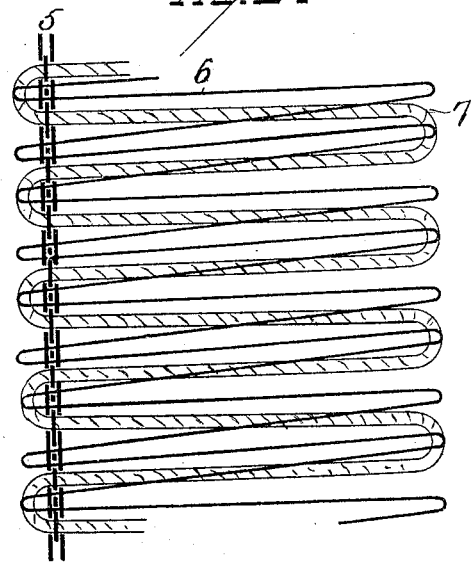
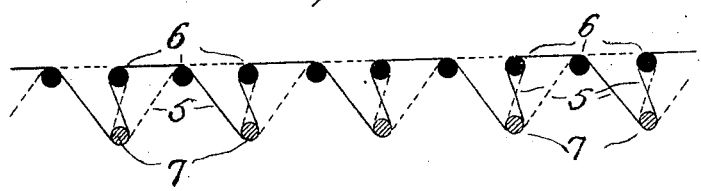
WITNESSES
INVENTOR
W. C. Fisher
By H. A. Seymour
Attorney

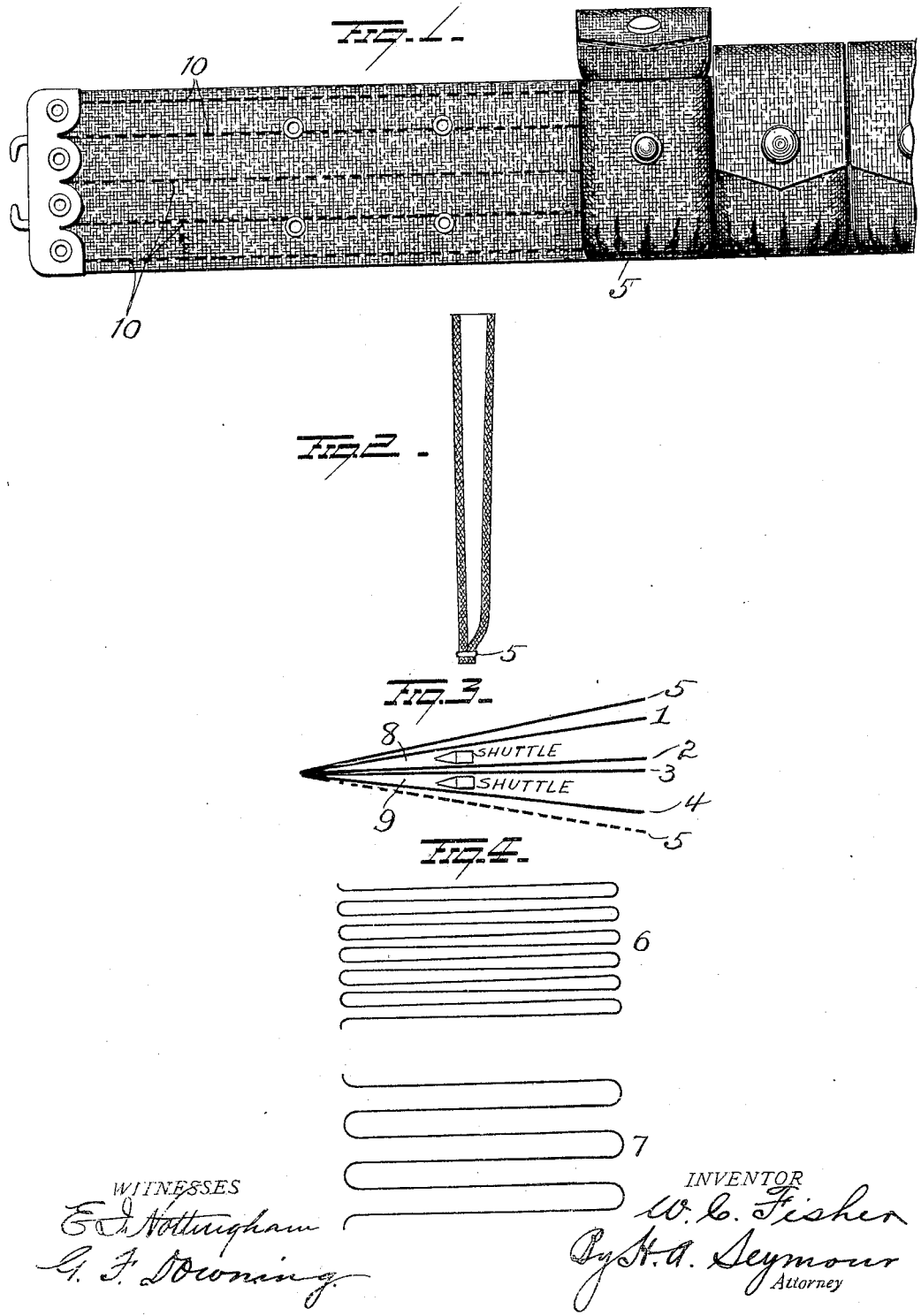

UNITED STATES PATENT OFFICE.

WILLIAM C. FISHER, OF MIDDLETOWN, CONNECTICUT, ASSIGNOR TO THE RUSSELL MANUFACTURING COMPANY, OF MIDDLETOWN, CONNECTICUT.

WOVEN CARTRIDGE-BELT.

No. 803,221.     Specification of Letters Patent.     Patented Oct. 31, 1905.

Application filed December 31, 1904. Serial No. 239,223.

*To all whom it may concern:*

Be it known that I, WILLIAM C. FISHER, a resident of Middletown, in the county of Middlesex and State of Connecticut, have invented certain new and useful Improvements in Woven Cartridge-Belts; and I do hereby declare the following to be a full, clear, and exact description of the invention, such as will enable others skilled in the art to which it appertains to make and use the same.

My invention relates to an improved woven cartridge-belt and method of weaving the same, the object of the invention being to provide a belt having integrally-woven pockets, in which the pocket-ply and body-ply of the belt are woven simultaneously by separate shuttles, and warp binder-threads are employed to close the bottom of the pockets and weave the pocket and body plies together. Heretofore in the manufacture of belts of this character a single shuttle was employed to form the picks of the body and pocket plies, and the juncture of the pocket and body plies at the bottom of the pocket is effected by means of these weft-threads or picks, as such alternate formation of the body and pocket picks serves to integrally weave the two together at the bottom of the pocket. In other words, the weft-threads bind the pocket and body plies together, which necessitates the picks of the pocket-ply being made of different length, as some of the picks must extend around the edge by the movement of the shuttle in forming a body-pick after the formation of several pocket-picks. By this method, wherein but a single shuttle can be employed to weave both the pocket and body plies, considerable time is consumed, which is saved by my method to be hereinafter pointed out, and my invention therefore results in a great saving of time, and consequently reduces the cost of manufacture by reason of the increased output.

An object much to be desired in the manufacture of cartridge-belts is to secure the greatest depth of pocket in a belt of minimum width. The belt made according to the method heretofore in use sacrifices some of the width of the belt to close the bottom of the pocket by its weft-threads, while I bring the pocket-bottom closer to the edge of the belt and as near to the edge as it is possible to do and at the same time weave a belt with the pockets integral.

My invention consists in forming the pocket and body plies by separately-operating shuttles, which may be operated simultaneously or not, and joining the plies at the bottom of the pockets by warp binder-threads. This permits the pocket portion of the belt to be woven much faster than heretofore, and a great saving of time is accomplished. The shuttles are arranged to work independently of each other, thus permitting the weaving of the pocket portions at the same time that the back or body portion is being made. The upper shuttle is employed to make the pocket portion and the lower shuttle to weave the body portion. The pocket-bottom closure is brought as near to the edge of the belt as is possible with an integral pocket, and a smoother juncture of the pocket bottom and body is accomplished, as the difference in width or length of the pocket and body portions beneath the same can be more perfectly compensated for by the tight weaving of the pocket end by the warp binding-threads.

In the accompanying drawings, Figure 1 is a view in elevation of a portion of my improved belt. Fig. 2 is an enlarged view in cross-section through a sprocket with the flap or cover omitted, and Figs. 3, 4, 5, and 6 are diagrammatic views illustrating the method of weaving.

As shown in Fig. 3, 1 and 2 represent the warp-threads to form the pocket portion, 3 and 4 the warp-threads to form the body portion, and 5 the warp binder-thread. The picks 6 of the weft forming the pocket, as shown diagrammatically in Fig. 4, are of the same length as the picks 7 of the weft forming the body; but there are about twice as many picks 6 as there are picks 7 to secure the necessary fullness of the pocket. The picks 6 and 7 are inserted by separate shuttles, which pass back and forth through the openings 8 and 9, respectively, in the shed, (shown in Fig. 3,) the warp-threads 1 2 and 3 4, respectively, changing their positions after each movement of the shuttles, and at regular intervals the warp binder-threads 5 move downward past both openings 8 and 9 to the position shown in dotted lines and back to the position shown in full lines to weave the pocket-ply and body-ply together at the edge of the belt, as shown in Fig. 2.

Separate operating mechanisms will be employed for the respective shuttles, so that they can be run either at the same time or separately.

Referring to Fig. 5 of the drawings, the fine lines 6 represent the filling-threads put in by the upper shuttle, and the coarse lines 7 represent the filling-threads put in by the lower shuttle, while the heavy lines 5 represent the binder-threads which bind the two plies together and form the pocket.

In Fig. 6 the solid black dots represent the filling-threads 6 put in by the upper shuttle, and the shaded dots represent the filling-threads 7 put in by the lower shuttle. The lines 5 in Fig. 6 show the manner the binding-threads pass around the filling-threads and bind the two plies together. By following the lines c in Fig. 6 it will be noticed that they go around the filling-threads of both shuttles.

While weaving that portion of the belt containing pockets the shuttles may operate as follows: One pick of weft in the pocket portion, only using one shuttle, the next revolution of the loom will cause a double shed, as shown in Fig. 3, and both shuttles will operate, and the same operations will be repeated until the pocket has been completed—that is to say, one revolution of the loom will put in one pick only, the next revolution will put in two picks, one from each shuttle, the shuttle passing through the double shed, as shown in Fig. 3.

The method of weaving may be described more in detail as follows: In making the plain portion of the belt (shown in Fig. 1) the loom forms only one shed and the lower shuttle only is used; but when the pocket portion is reached I run one or two shuttles in the following manner: I use the upper shuttle for weaving the pocket and the lower shuttle for weaving the body of the belt under the pocket. In order to secure the necessary fullness for the pocket, I should have about twice as many picks in it as I put into the body of the belt under the pocket, running it as follows: one pick of weft in the pocket portion, only using one shuttle. The next revolution of the loom I will have a double shed, as shown in Fig. 3, and both shuttles will operate, the upper shuttle putting in a pick in the pocket portion and the lower shuttle putting in a pick in the body portion under the pocket, and the two portions are united on one side by means of binder-threads, which work from the upper part of the top shed to the bottom of the lower shed, thus uniting the two portions at this point and forming the pocket.

By this method of weaving the pockets integral with the body the surplus of material of the pocket, while it will necessarily crinkle slightly at the bottom of the pocket where it joins the body, still it will be subjected to such pressure in weaving by the warp binder-threads 5 that such crinkling or unevenness will be reduced to the minimum, and the closure of the pocket-bottom will be brought as close to the belt edge as is possible to do so and interweave the threads.

Between the pockets and at the belt ends a single one of the shuttles is employed and weaves all of the threads together, the binder-threads 5 running throughout the belt, and additional binder-threads 10, which continue through the body portion of the belt at the pockets, also assist the binder-threads 5 to effectually tie the double-ply weave together at the ends and between the pockets of the belt.

Having fully described my invention, what I claim as new, and desire to secure by Letters Patent, is—

1. A woven cartridge-belt having integral woven pockets, comprising a multi-ply fabric, each ply of which is the same in width, one ply separated from the other at intervals and united therewith at its ends, and longitudinal binding-threads uniting the separated plies at one edge of the belt to form pockets.

2. A woven cartridge-belt having integral pockets, the same comprising a multi-ply woven fabric, each ply comprising weft or filling threads all of the same length and extending from one edge of the belt to the other, one set of weft or filling threads separated at intervals from the other set, and longitudinal binding-threads interwoven with both sets of weft or filling threads and uniting them at one edge of the belt to form integral pockets.

3. A multi-ply woven belt having integral pockets, the same comprising a body-ply and a pocket-ply, both the same in width, the pocket-ply separated at intervals from the body-ply, each separated portion of the pocket-ply having a greater number of filling-threads than the body-ply behind it and united at its ends with said body-ply, and longitudinal binding-threads interwoven with said body and pocket plies at one edge of the belt and uniting said plies to form pockets.

4. A woven-fabric belt adapted to accommodate cartridges, consisting of multi-ply woven fabric having pockets integral therewith formed by an outer ply of greater length than the inner or body ply, said portions of the outer ply being united to the body of the belt adjacent to one edge of the fabric, by warp binder-threads merging into both the outer and inner plies.

5. A woven-fabric belt to accommodate cartridges, consisting of multi-ply woven fabric having pockets integral therewith, formed by an outer ply of greater length than the inner or body ply, said portions of the outer ply being united to the body-ply of the belt along a selvage edge by warp binder-threads merging into both the outer and inner plies of the belt and joining the two plies, which latter are separately woven.

6. A woven-fabric belt to accommodate cartridges, consisting of multi-ply woven fabric having pockets integral therewith formed by an outer ply of greater length than the inner or body ply, said outer ply being united to the body-ply of the belt along a selvage edge by warp binder-threads, which also form parts of the weave of the outer and body plies and the belt portions at the ends thereof and between the pockets.

In testimony whereof I have signed this specification in the presence of two subscribing witnesses.

WILLIAM C. FISHER.

Witnesses:
A. L. PRATT,
H. W. HUBBARD.